(12) United States Patent
Koodli (10) Patent No.: US 6,608,841 B1
(45) Date of Patent: Aug. 19, 2003

(54) SYSTEM AND METHOD FOR ACHIEVING ROBUST IP/UDP/RTP HEADER COMPRESSION IN THE PRESENCE OF UNRELIABLE NETWORKS

(75) Inventor: Rajeev Koodli, Natick, MA (US)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/476,205

(22) Filed: Dec. 30, 1999

(51) Int. Cl.[7] ................................................. H04J 3/24
(52) U.S. Cl. ........................... 370/474; 709/247; 341/60
(58) Field of Search ................................. 370/252, 349, 370/401, 402, 394, 410, 474, 522–524, 477, 392; 341/60, 51; 709/216, 217, 246, 247

(56) References Cited

U.S. PATENT DOCUMENTS

| | | | | |
|---|---|---|---|---|
| 5,148,272 A | * | 9/1992 | Acampora et al. | 375/240.1 |
| 5,246,779 A | * | 9/1993 | Heimberg et al. | 428/402 |
| 5,987,022 A | * | 11/1999 | Geiger et al. | 370/349 |
| 6,032,197 A | * | 2/2000 | Birdwell et al. | 709/247 |
| 6,125,348 A | * | 9/2000 | Levine | 704/500 |
| 6,198,735 B1 | * | 3/2001 | Pazhyannur et al. | 370/349 |
| 6,292,840 B1 | * | 9/2001 | Blomfield-Brown et al. | 709/247 |
| 6,300,887 B1 | * | 10/2001 | Le | 341/60 |
| 6,519,223 B1 | * | 2/2003 | Wager et al. | 370/216 |

OTHER PUBLICATIONS

S. Casner, et al., "Compressing IP/UDP/RTP Headers for Low–Speed Serial Links", IETF, Network Working Group, Request for Comments RFC–2508, Feb. 1999, pp. 1–23.

M. Degermark, et al., "Low–Loss TCP/IP Header Compression for Wireless Networks", Wireless Networks, US, ACM, vol. 3, No. 5, Oct. 1, 1997, pp. 375–387.

* cited by examiner

Primary Examiner—Douglas Olms
Assistant Examiner—Van Nguyen
(74) Attorney, Agent, or Firm—Antonelli, Terry, Stout & Kraus, LLP (57) ABSTRACT

A robust IP/UDP/RTP header compression mechanism is provided to correctly reconstruct IP/UDP/RTP headers in the presence of packet losses and errors of unreliable networks. The header compression mechanism may include a compressor/de-compressor implemented for operation similarly to RFC 2508 but designed specifically to address robustness when employed in lossy and error-prone networks. The robust header compression scheme requires that, when a second-order difference of a field is non-zero, not only a particular RTP packet whose second-order difference is non-zero is sent with the new first-order difference, but also those following packets are also sent with the new first-order difference as long as: (a) a period pre-determined by factors such as channel characteristics (e.g., link round-trip time RTT/inter-packet separation); or (b) a positive confirmation is received by the compressor that the new first-order difference has been correctly received. In addition, during a period of communicating with the new first-order difference, if the corresponding RTP field changes again with non-zero second-order difference, the "new" first-order difference is combined with the original first-order difference such that the two first-order differences may be appended together as a simple means of communicating the two first-order differences reliably.

33 Claims, 5 Drawing Sheets

SYSTEM AND METHOD FOR ACHIEVING ROBUST IP/UDP/RTP HEADER COMPRESSION IN THE PRESENCE OF UNRELIABLE NETWORKS

BACKGROUND OF THE INVENTION

Technical Field

The present invention relates to data compression and decompression in a data network and more particularly, relates to a system and method for achieving robust IP/UDP/RTP header compression in the presence of unreliable networks.

Related Art

In recent years, increased usage of the Internet has resulted in scarcity of network capacity, and compromised performance of traditional applications. At the same time, new applications such as interactive audio and/or video, including video-conferencing or Voice over IP (VoIP) have emerged which demand timely data delivery and much improved quality of service. Real-Time Transfer Protocol (RTP) has been used to obtain inter-operability among different implementations of network real-time applications such as video-conferencing and Voice over IP. For Internet Protocol (IP) based real-time multimedia, RTP may be used on top of User Datagram Protocol (UDP/IP) to make use of multiplexing and checksum services as described in the "*RTP: A Transport Protocol For Real-Time Applications*" by Henning Schulzrinne, Stephen L. Casner, Ron Frederick, and Van Jacobson, Request For Comments (RFC) 1889, January 1996. However, there is concern that RTP headers may be too large for acceptable interactive response and line efficiency, when operating over low speed lines such as dial-up modems. For example, in the Internet Protocol version 4 (IPv4), header fields including IP/UDP/RTP may occupy 40 bytes per packet. Likewise, such header fields may occupy 60 bytes per packet in the Internet Protocol version 6 (IPv6). This header-overhead is quite considerable in real-time applications such as conversational voice where the actual voice payload may be as little as 36 bytes (corresponding to 20 ms of GSM coded voice). As a result, such header-overhead needs to be significantly reduced for real-time applications.

Currently, there are few header compression techniques available to compress headers of IP/UDP/RTP datagrams in order to reduce the header-overhead and allow efficient use of bandwidth on low and medium speed links. Most recent example of such header compression techniques is described in the "*Compressing IP/UDP/RTP Headers For Low-Speed Serial Links*" by Stephen L. Casner, and Van Jacobson, RFC 2508, February 1999. A header compression mechanism is provided with a compressor/de-compressor for compressing headers of IP/UDP/RTP datagrams to reduce header-overhead to 2–4 bytes. The header compression scheme is based on the observation that most fields of the EP headers remain constant in a packet stream over the life of the connection (i.e., length of a session). Therefore, header compression may be achieved by maintaining a compression state at the de-compressor and by simply transporting a minimal amount of header-overhead (such as a session context identifier and a small sequence number used for error and packet loss detection) from the compressor to the de-compressor. According to RFC 2508, the compression state at the de-compressor may correspond to uncompressed header fields including those that change in every packet and those that do not change in every packet. For the non-changing fields (such as source and destination IP addresses and port numbers), the de-compressor may simply add the corresponding fields stored in the compression state. For the changing fields, however, the de-compressor may rely on the information sent in the compressed packet header. Typically, the information contained in the compressed packet header includes the difference in change with respect to the value of the field in the previous packet (i.e., only non-zero second-order differences of changing fields), and does not include the changed field itself.

For general operation, the compressor starts off by sending full IP/UDP/RTP headers to the de-compressor until the de-compressor establishes a context state for the non-changing fields as well as the first-order difference(s) for the changing fields. Once the context state is established, the compressor need not send the first-order differences (especially those corresponding to RTP header fields such as RTP timestamp and RTP sequence number) unless the second-order difference (delta) is non-zero. When the second-order difference (delta) of the RTP header from packet to packet is zero, the de-compressor can reconstruct a packet without any loss of information by simply adding the first-order differences to the saved uncompressed header representing the previous packet as each compressed packet is received. All that needs to be communicated is a session context identifier (ID) and a small sequence number (not related to the RTP sequence number) in order to maintain synchronization and detect packet loss between the compressor and de-compressor. For example, if the RTP timestamp changes from 20 to 40 to 60 for packets #1, #2 and #3, the first-order difference between 20 and 40 and between 40 and 60 is 20. When the initial value of 20 is known, the de-compressor may simply add the correct increment for packet #3 if an appropriate field in the compressed header indicates that the second-order difference is zero.

On the other hand, if the second-order difference (delta) of the RTP header is not zero for some fields, the new first-order difference for just those fields must be communicated using a compact encoding. The new first-order difference values are added to the corresponding fields in the uncompressed header in the session context of the de-compressor, and are also stored explicitly in the session context to be added to the corresponding fields again on each subsequent packet in which the second-order difference (delta) is zero. Each time the first-order difference changes on subsequent packets, that difference is transmitted and used to update the session context.

However, the header compression scheme as described in RFC 2508 and other RFC documents which contain Internet Standard protocols available to the Internet community are not suitable for operation in environments (such as cellular wireless networks) where bandwidth is at a premium and there are high link errors and high link latencies. The loss of a packet can force the de-compressor to append incorrect header information, such as RTP timestamp and RTP sequence number, to the next successfully received packet. Similarly, if a compressed packet header is in error, similar incorrect reconstruction of an RTP packet can result. For instance, if a packet containing the new first-order difference for a field (or multiple fields) is considered lost (perhaps due to errors), the headers for the subsequent packets cannot be correctly reconstructed until the de-compressor has notified the compressor, and the compressor has successfully re-transmitted the required first-order difference. During this recovery phase, the packets already transmitted and in transit cannot be operated upon for header reconstructions. For real-time applications, such as Voice over IP (VoIP) and Video Conferencing, those packets may be discarded due to the expiration of play-out deadlines. For example, consider a cellular link that has a 60 ms one way delay from the radio access point (such as a base station) to a mobile station (or 120 ms round-trip delay from base station to mobile station and back to base station), and an inter-packet separation between voice packets is 20 ms during a talkspurt. At the start a talkspurt, the RTP timestamp of the very first packet usually increments such that its second-order difference is non-zero due to the silence interval. Therefore, a new first-order difference has to be communicated to the de-compressor in this very first packet. If the packet is somehow lost due to errors, the following three packets (60 ms/20 ms) cannot be reconstructed until the de-compressor informs the compressor about the failure, during which time another three packets would have been transmitted by the compressor (assuming that a talkspurt lasts for at least six packets). All these six packets have to wait until the correct first-order difference is received by the de-compressor, and as a result, may be discarded due to play-out deadline expiration.

Accordingly, there is a need for a robust IP/UDP/RTP header compression scheme in the presence of unreliable networks. In addition, needed is a scheme that can correctly reconstruct headers in the presence of packet losses and errors.

SUMMARY OF THE INVENTION

Accordingly, various embodiments of the present invention are directed to a robust IP/UDP/RTP header compression mechanism and technique that can correctly reconstruct IP/UDP/RTP headers in the presence of packet losses and errors. The header compression mechanism includes a compressor/de-compressor implemented for operation similarly to RFC 2508 but designed specifically to address robustness when employed in lossy and error-prone networks to correctly reconstruct headers in the presence of packet losses and errors.

In accordance with one aspect of the present invention, the robust header compression scheme requires that, when a second-order difference of a field is non-zero, not only a particular RTP packet whose second-order difference is non-zero is sent with the new first-order difference, but also those following packets are also sent with the new first-order difference as long as: (a) a period pre-determined by factors such as channel characteristics (e.g., link round-trip time RTP/inter-packet separation); or (b) a positive confirmation is received by the compressor that the new first-order difference has been correctly received. This will ensure that even if the packet that caused the second-order difference to be non-zero is lost, the following packets are "self-contained" so that the de-compressor can correctly reconstruct their headers.

In accordance with another aspect of the present invention, the robust header compression scheme requires that, if the corresponding RTP field changes again with non-zero second-order difference during the period of communicating the first-order difference, the "new" first-order difference is combined with the original first-order difference such that the two first-order differences may be appended together as a simple means of communicating the two first-order differences reliably. However, the present invention does not preclude other means of combining the first-order differences for efficiency purposes.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAIL DESCRIPTION OF EMBODIMENTS OF THE INVENTION

The present invention is applicable for use with all types of data networks and real-time communication services. For example, data networks may be packet networks, including Ethernet local area networks (LANs), Asynchronous Transfer Mode (ATM), Frame Relay, and Internet used for real-time applications such as Voice over IP and Video conferencing (Video over IP). Alternatively, such data networks may also be private or public networks, including a plain old telephone service (POTS), a public switched telephone network (PSTN), an integrated services digital network (ISDN), a mobile network, a satellite network, and networks such as terrestrial digital TV or radio, cellular, short-range radio (Bluetooth, RF protocol, wireless LAN) networks. However, for the sake of simplicity, discussions will concentrate mainly on a simple data network of different configurations for real-time applications such as Voice over IP (VoIP) and Video conferencing (Video over IP), although the scope and implementation of the present invention is not limited thereto.

Figure 1:
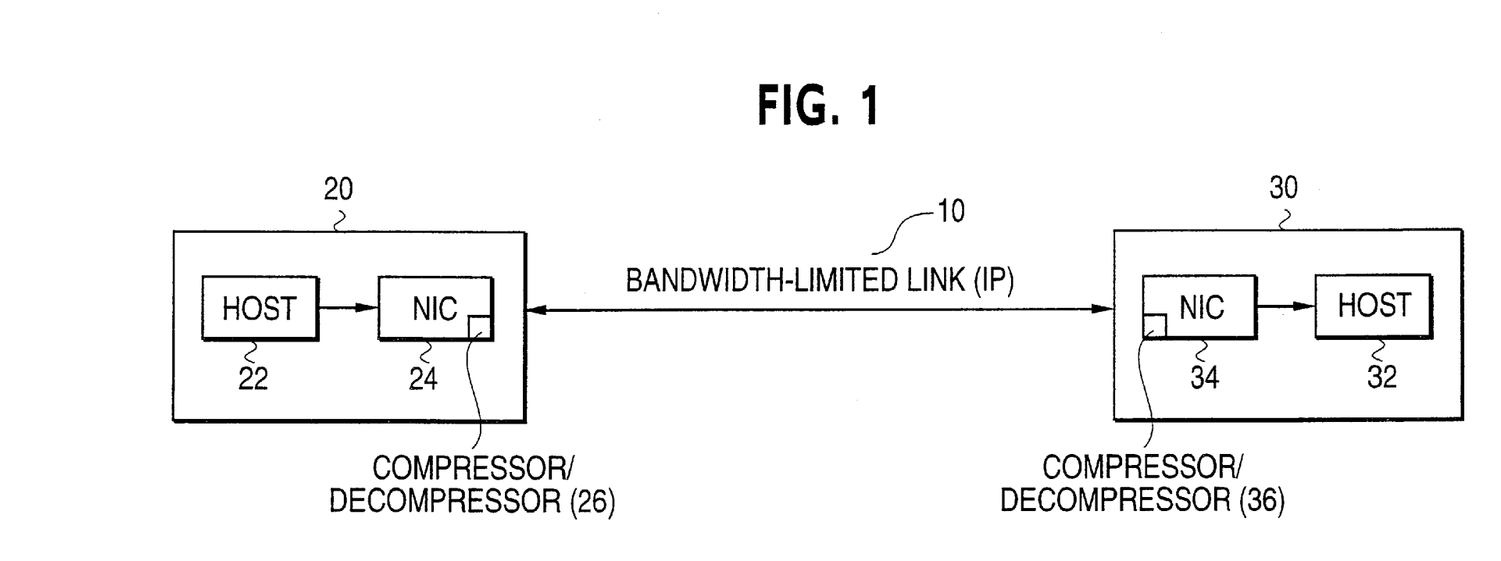
FIG. 1 illustrates an example data network of a source terminal and a destination terminal including a header compressor mechanism provided for header compression and for data communications via a bandwidth-limited link according to an embodiment of the present invention.

Attention now is directed to the drawings and particularly to FIG. 1, a simple data network of a source terminal 20 and a destination terminal 30 according to an embodiment of the present invention. As shown in FIG. 1, a bandwidth-limited link 10 may be utilized to connect a source terminal 20 to a destination terminal 30. The bandwidth-limited link 10 may represent low speed lines such as dial-up modems, or radio-frequency (RF) wireless links (cellular links). Alternatively, the bandwidth-limited link 10 may include an IP-based network of an Internet Service Provider (ISP), an Internet and different source and destination networks, including, for example, a public switched telephone network (PSTN), an integrated services digital network (ISDN) and other access network infrastructures (ANI) for enabling communications between the source terminal 20 and the destination terminal 30. If the bandwidth-limited link 10 corresponds to cellular links, the source terminal 20 and the destination terminal 30 may correspond to a mobile terminal and a base station respectively and vice versa.

The source terminal 20 includes, for example, at least host 22 and a network interface controller (NIC) 24. Likewise, the destination terminal 30 includes, for example, at least a host 32 and a network interface controller (NIC) 34. Multiple hosts may be included in the source terminal 20 and the destination terminal 30. Each host may correspond to an IP phone or a stand-alone PC for sending data packets from the source terminal 20 to the destination terminal 30 via the bandwidth-limited link 10.

In the source terminal 20, the host 22 generates data which is forwarded to the network interface controller (NIC) 24. The NIC 24 of the source terminal 20 transforms incoming data from host 22 into data packets using, for example, Real-Time Transfer Protocol (RTP) used on top of User Datagram Protocol (UDP/IP), and injects the data packets via the bandwidth-limited link 10. If the bandwidth-limited link 10 is an IP-based network, the rate of that data packets are injected via the IP-based network 10 and the outward flow of data packets are controlled and managed by the NIC 24 to avoid congestion and to limit bandwidth usage of data packets in the IP-based network 10. The IP-based network 10 accepts incoming data packets and forwards the same to destination terminal 30 according to the information contained in the header. The NIC 34 of the destination terminal 30 receives the data packets from the IP-based network 10, transforms the same into data and forwards the data to the host 32.

Figure 2A:
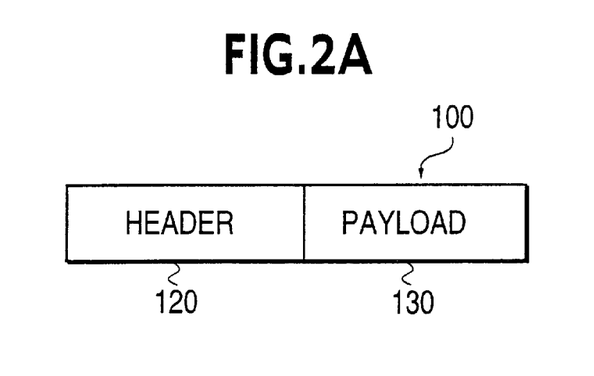
FIGS. 2A–2B illustrate an example data packet for use in an example data network according to an embodiment of the present invention.
Figure 2B:
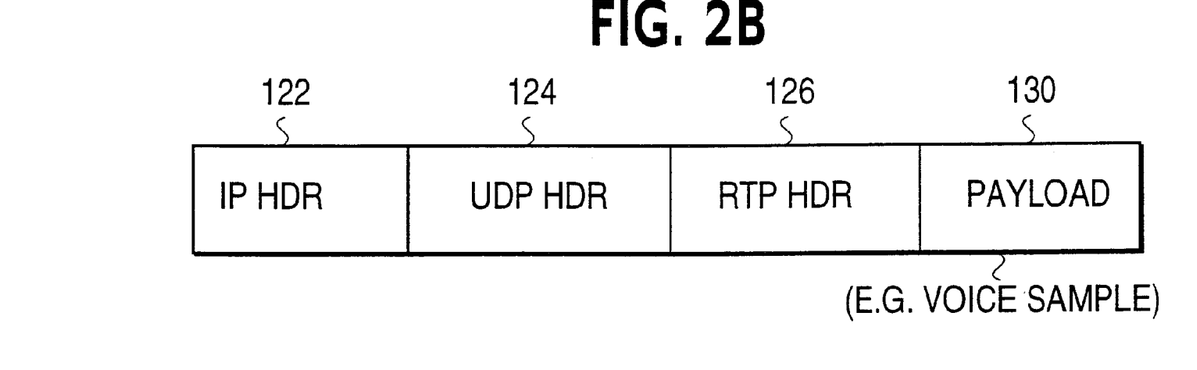

FIGS. 2A–2B illustrate an example data packet for use in a simple data network according to an embodiment of the present invention. As shown in FIG. 2A, an example data packet 100 consists of a segment of data payload 130 and a small header 120 prepended to the data payload 130. The packet 100 may represent, but may not be limited to, real-time traffic of Voice over IP (VOIP) or Video over IP. The header segment 120 contains, for example, IP addresses fields (32-bit global Internet address, generally consisting of a network identifier and a host identifier), a version field used to specify which version of the IP is represented in the IP packet (for example, IP Version 4 and IP Version 6), a type of service field used to specify how the IP packet is to be handled in IP-based networks which offer various service qualities, and a header checksum field used to verify transmission error. Other IP fields such as flags and fragment offset fields, a total length field, an ID field, a time to live field and a protocol field may also be included in such a header. In the Internet Protocol version 4 (IPv4), header fields including IP/UDP/RTP may occupy 40 bytes per packet, and 60 bytes per packet for Internet Protocol version 6 (IPv6). The header-overhead is typically sizable relative to the data payload, particularly for real-time applications using Real-Time Transfer Protocol (RTP) used on top of User Datagram Protocol (UDP/IP) such as conversational voice where the actual voice payload may be as little as 36 bytes (corresponding to 20 ms of GSM coded voice).

FIG. 2B illustrates an example header segment 120 which includes the combination of an IP header 122, an UDP header 124 and an RTP header 126, and the data payload 130 which contains, for example, voice samples shown in FIG. 2A.

Figure 3:
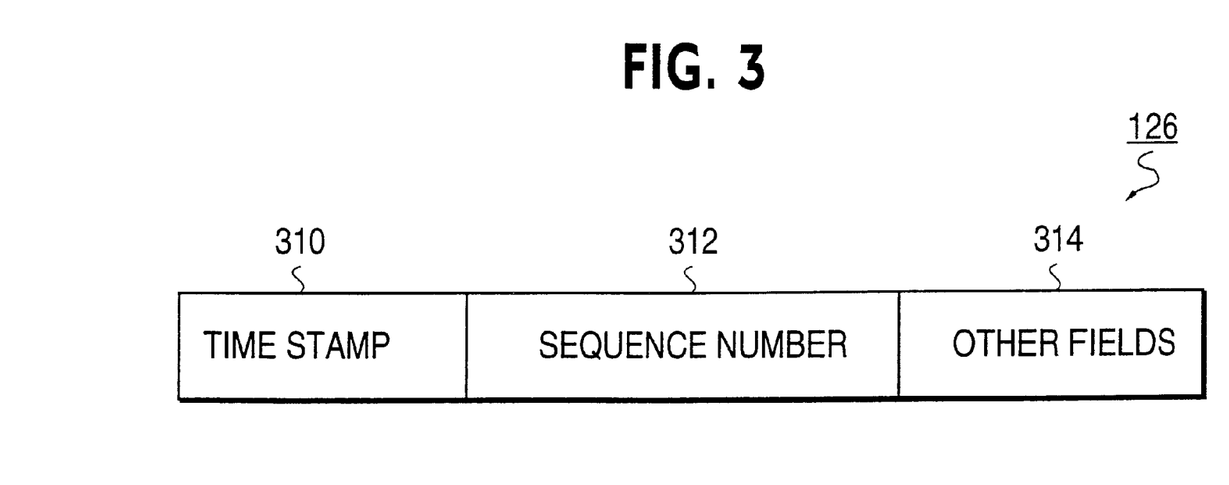
FIG. 3 illustrates an example RTP header segment of the data packet in an uncompressed format according to an embodiment of the present invention.

FIG. 3 illustrates an example RTP header 126 in an uncompressed format according to an embodiment of the present invention. As shown in FIG. 3, the uncompressed RTP header 126 includes a timestamp (T) 310, a sequence number (Sn) 312, and other fields 314. Due to the packet-switched nature of IP network (see FIG. 1), RTP packets may arrive out of order. The sequence number 312 may be used at a destination terminal 30 to assemble RTP voice samples in the correct order. However, the sequence numbers in the RTP packets may not reflect any nonlinear change in the field (e.g., intervals of silence of the voice signal). Therefore, a timestamp (T) 310 may be provided to indicate the relative timing of each packet.

As described previously, the 40–60 byte header-overhead supplied by the IP/UDP/RTP headers in each RTP packet may be too large. In particular, RTP timestamp may be too burdensome for RTP packets to transport via low speed lines such as dial-up modems or bandwidth-limited links. Accordingly, included in the NIC 24 of source terminal 20 of the data network shown in FIG. 1 (also in the NIC 34 of destination terminal 20 for bidirectional communications on an end-to-end basis) is typically a header compression mechanism 26 and 36 for header compression at source terminal 20 and destination terminal 30 to reduce header-overhead for acceptable interactive response and line efficiency, when operating over low speed lines such as dial-up modems or bandwidth-limited links. The header compression mechanism 26 and 36 may be provided with a compressor/de-compressor for compressing headers of IP/UDP/RTP datagrams to reduce header-overhead to 2–4 bytes. The header compression mechanism 26 and 36 may be implemented by hardware and/or software configured by standard programming methods using high level program languages such as C or C++ and a general purpose computer to achieve header compression. If the header compression mechanism 26 and 36 is implemented by a software module, such a software module may be provided on a tangible medium, including, but not limited to: semiconductor memory devices such as EPROM, EEPROM, and flash devices; magnetic disks (fixed, floppy, and removable); other magnetic media such as tape; and optical media such as CD-ROM disks. Such software module may also be bundled with the host network interface card. Alternatively, the header compression mechanism 26 and 36 may also be available as a firmware module or a comprehensive hardware/software module which may be built-in the host. In addition, the header compressor mechanism 26 and 36 may be implemented for operation similarly to RFC 2508 but designed specifically to address robustness when employed in lossy and error-prone network environments characterized by high link errors and high latencies such as cellular networks in order to correctly reconstruct headers in the presence of packet losses and errors.

The specific number and arrangement of source and destination terminals and links shown in FIG. 1 is provided simply as an example data network using a header compression scheme for header compression and transmission of data packets via a data link where bandwidth is at a premium and errors may not be uncommon. A wide variety of implementations and arrangements of any number of terminals, switches and links in all types of data networks may be possible.

For header compression operation, the compressor 26 of source terminal 20 starts off by sending full IP/UDP/RTP headers to the de-compressor 36 of destination terminal 30 until the de-compressor 36 establishes a context state for the non-changing fields as well as the first-order difference(s) for the changing fields in the same manner described in RFC 2508. That is, when the context state is established, the compressor 26 of source terminal 20 need not send the first-order differences (especially those corresponding to RTP header fields, for example, such as RTP timestamp and RTP sequence number) unless the second-order difference (delta) is non-zero. When the second-order difference (delta) of the RTP header (or IP/UDP header of a data packet) from packet to packet is zero, the de-compressor 36 of destination terminal 30 may reconstruct a packet without any loss of information by simply adding the first-order differences to the saved uncompressed header representing the previous packet as each compressed packet is received.

When the second-order difference (delta) of the RTP header of any field is non-zero, the compressor 26 of source terminal 20 operates to send the new first-order difference of the corresponding field in the manner described in RFC 2508. However, in addition to RFC 2508, the header compression mechanism 26 and 36 is specifically designed and implemented to address robustness when employed in lossy, error-prone and unreliable networks (such as cellular or wireless networks where bandwidth is a premium and there may be high link errors and high latencies) to correctly reconstruct headers in the presence of packet losses and errors.

Generally, the header compression scheme of the present invention requires that, when a second-order difference of a field is non-zero, not only a particular RTP packet whose second-order difference is non-zero is sent with the new first-order difference, but also those following packets are also sent from the compressor 26 of source terminal 20 with the new first-order difference as long as: (a) a period pre-determined by factors such as channel characteristics (e.g., link round-trip time RTT/inter-packet separation; round-trip time RTT is an estimate of how long a data packet or frame to travel from the source terminal 20 to the destination terminal 30 and for an acknowledgment to be returned to the source terminal 20), or (b) a positive confirmation is received by the compressor 26 of source terminal 20 that the new first-order difference has been correctly received. This requirement will ensure that even if the packet that caused the second-order difference to be non-zero is lost, the following packets are "self-contained" so that the de-compressor 36 of destination terminal 30 can correctly reconstruct their headers.

In accordance with another aspect of the present invention, if the corresponding RTP field changes again with a non-zero second-order difference during the period of communicating the first-order difference, the "new" first-order difference may be combined with the original first-order difference such that the two first-order differences may be appended together as a simple means of communicating the two first-order differences reliably. However, the present invention does not preclude other means of combining the first-order differences for efficiency purposes.

Figure 4A:
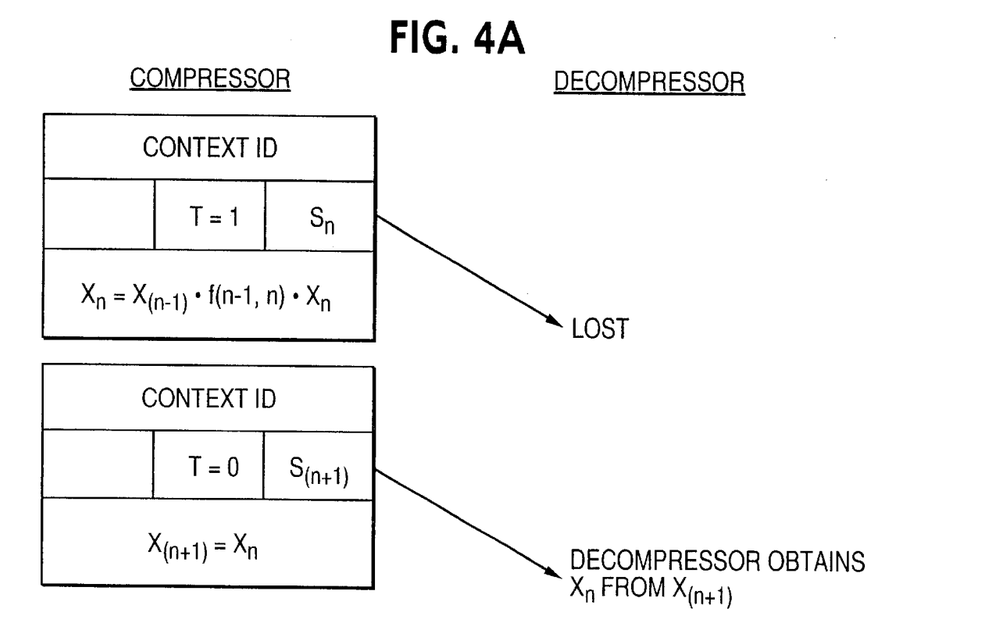
FIGS. 4A–4B illustrate operations of a compressor of source terminal and a de-compressor of destination terminal for a changing field according to an embodiment of the present invention.
Figure 4B:
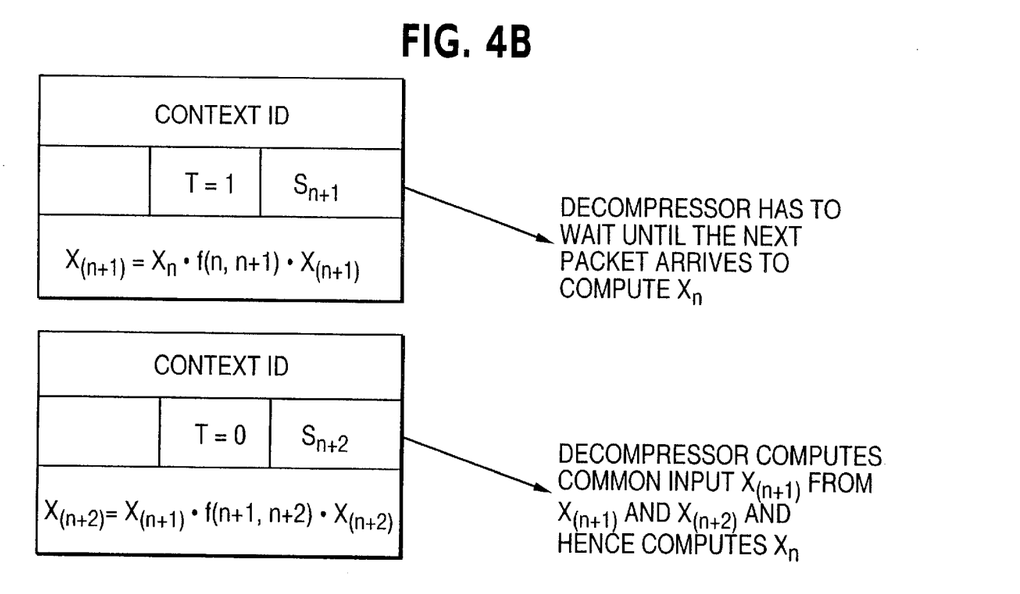

Turning now to FIGS. 4A–4B, the operations of a compressor 26 of source terminal 20 and a de-compressor 36 of destination terminal 30 for a changing field and examples of how IP/UDP/RTP headers can be reconstructed in the presence of packet losses and errors according to an embodiment of the present invention will be described hereinbelow.

For a single changing field, let $x_n$ be the first-order differential encoding (i.e., encoded value of first-order difference) of a field $g_n$ which has to be transmitted by the compressor 26 of source terminal 20 because it has changed by an amount other than the normal expected value in a packet $p_n$ and it has not been successfully received by the de-compressor 36 of destination terminal 30.

Define $$X_n = x_{(n-1)} \cdot f(n-1, n) \cdot x_n,$$

and $$X_{(n+1)} = x_n \cdot f(n, n+1) \cdot x_{(n+1)},$$

where $f(i,j)$ is such that $x_n$ (the common input) can be computed from $X_n$ and $x_{(n+1)}$, and given $X_n$ and $x_n$, $x_{(n-1)}$ can be uniquely computed. Furthermore, $f(i,j)$ is such that if either one of the inputs $x_n$ or $x_{(n-1)}$ is zero, define $X_n$=the non-zero input.

The simplest form of $f(i,j)$ is the "append" function, which simply adds redundancy to an existing field. For example, $X_n$ above can consist of both $x_{(n-1)}$ and $x_n$. More sophisticated functions may be used; however, a tradeoff exists between the complexity of the function and the reduction in bits needed to represent $X_n$.

The compressor 26 of source terminal 20 may compute $X_n$ for packet $p_n$, and $X_{(n+1)}$ for $p_{(n+1)}$ even if the corresponding field $g_{(n+1)}$ does not change by an amount other than the expected amount (in which case $x_{(n+1)}$ will be zero). The compressor 26 of source terminal 20 sends $X_n$ in $p_n$, rather than $x_n$, and $x_{(n+1)}$ in $p_{(n+1)}$ rather than $x_{(n+1)}$.

If packet $p_n$ is lost, but $p_{(n+1)}$ and $p_{(n+2)}$ are received, then $x_{(n+1)}$ can be computed, and knowing $X_{(n+1)}$, $x_n$ can also be computed. Hence the loss of packet $p_n$ does not affect the correct reconstruction of headers. As a result, protection can be achieved against single packet losses.

When $f(i,j)$ is other than an "append" function, the computation of $X_n$ need not be limited to $x_n$ and $x_{(n-1)}$ alone. $X_n$ can be a function of all those $x_i$ such that i=i, i–1, i–2, . . . i–j for any suitable value of i–j as long as the corresponding function $f(i, i-j)$ exists such that from any two $X_i$ and $X_{(i+1)}$, the common inputs $x_i$, $x_{(i-1)}$, $x_{(i-2)}$, . . . , $x_{(i-j)}$ can be distinctly computed from $X_i$ and $X_{(i+1)}$. In such a case, the compressor 26 of source terminal 20 has to compute $X_i$ values up to $X_{(i-j)}$ when a field changes for purposes of providing protection against burst of packet losses.

When $f(i,j)$ is an "append" function, protection against burst packet losses is achieved by the requirement set forth as one aspect of the present invention, that is, when a second-order difference of a field is non-zero, not only a particular RTP packet whose second-order difference is non-zero is sent with the new first-order difference, but also those following packets are also sent with the new first-order difference as long as: (a) a period pre-determined by factors such as channel characteristics (e.g., link round-trip time RTP/inter-packet separation); or (b) a positive confirmation is received by the compressor that the new first-order difference has been correctly received.

As shown in FIGS. 4A–4B, the operations of the compressor 26 of source terminal 20 and the de-compressor 36 of destination terminal 30 for a changing field will be described as follows. In FIG. 4A, an example RTP packet 100 in a compressed format according to an embodiment of the present invention may include a context identifier (ID) field, a timestamp (T) field shown by flag "T" which indicates whether the timestamp (T) field is changing, and a sequence number (Sn). The rest of the fields are not shown for clarity.

Let T be the bit used to indicate whether the RTP timestamp field changes by a value other than the expected value (as described in RFC 2508).

Let delta timestamp (i.e., encoded value of first-order difference of RTP timestamp)=$x_n$ for packet $p_n$ with a sequence number $s_n$, and T=1 in the compressed header. Assume that packet $p_n$ is lost from the de-compressor 36 of destination terminal 30, which can be detected by the de-compressor 36 of destination terminal 30 when the next packet $p_{(n+1)}$ with sequence number $s_{(n+1)}$ arrives.

If T=0 in $p_{(n+1)}$, then the de-compressor 36 of destination terminal 30 still searches (because the previous packet was lost) for the delta-timestamp field, which the compressor 26 of source terminal 20 would have placed according to the methodology above. The delta-timestamp field would contain $x_n$. The de-compressor 36 obtains $x_n$ from $X_{(n+1)}$.

Next, as shown in FIG. 4B, if T=1, the de-compressor 36 of destination terminal 30 is required to search for delta-timestamp field. However, the de-compressor 36 of destination terminal 30 cannot compute the actual value of delta-timestamp ($x_n$) if the "f(i,j)" function is other than an "append" function, since the value contained in that field would be $X_{(n+1)}$. When f(i,j) is other than the "append" function, the de-compressor 36 of destination terminal 30 is forced to wait for an additional packet time. Note that waiting is not essential if the "f(i,j)" function is an "append" function that simply concatentates the two first-order differences.

When f(i,j) is other than an "append" function, and assuming that the following packet $p_{(n+2)}$ arrives successfully, the de-compressor 36 of destination terminal 30 can decode the common input $x_{(n+1)}$ (in $X_{(n+1)}$ and $X_{(n+2)}$). Since $X_{(n+1)}$ is known, the de-compressor 36 of destination terminal 30 can also compute the delta-timestamp $x_n$, as well as $x_{(n+2)}$. As shown in FIG. 4B, the de-compressor 36 of destination terminal 30 has to wait for the arrival of an additional packet before the field information can be successfully reconstructed. This wait time is the same (and constant) for the case involving bursty packet losses as well.

Figures 5A, 5B:
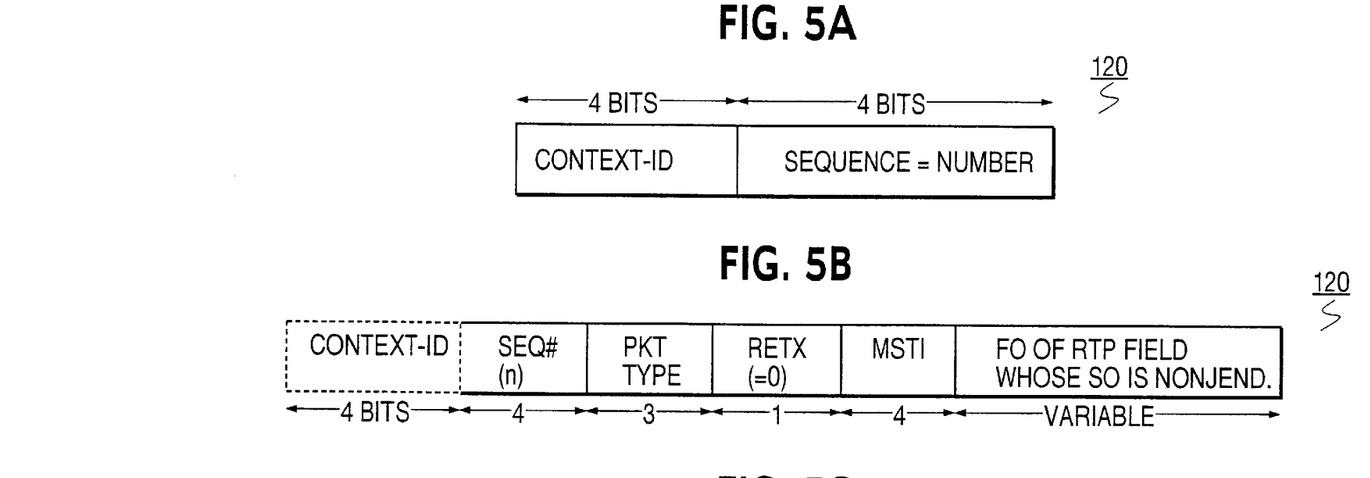
FIGS. 5A–5D illustrate different packet header formats of a data packet according to an embodiment of the present invention.

FIGS. 5A–5D illustrate different packet header formats of a data packet according to operations of a compressor 26 of source terminal 20 and a de-compressor 36 of destination terminal 30 shown in FIGS. 4A–4B. These packet header formats are shown assuming that f(i,j) is an "append" function. In particular, FIG. 5A illustrates a header format of a data packet when a second-order (SO) difference is zero. The header segment 120 of a data packet 100 (see FIG. 2A) may include a 4-bit context identifier (ID) field (which is the same as described in RFC 2508 and may be implicit and optional in certain networks such as cellular networks) and a 4-bit sequence number field. The header format shown in FIG. 5A is normally sent from the compressor 26 of source terminal 20 to the de-compressor 36 of destination terminal 30 in the manner described in RFC 2508, when the second-order (SO) difference is zero.

FIG. 5B illustrates a header format of a data packet when a second-order (SO) for packet "n" is non-zero. As shown in FIG. 5B, the header segment 120 of a data packet 100 may include a 4-bit context identifier (ID) field, a 4-bit sequence number (n) field for packet "n", a 3-bit packet type field which identifies the type of the packet (e.g., RTP compressed header, full header etc.), a 1-bit retransmit (ReTx=0) bit which indicates if the first-order (FO) difference being sent is for the packet with non-zero second-order (SO) difference or is for packets that follow it, a 4-bit combination (MSTI: marker bit, sequence number, timestamp and IP-ID) field as described in RFC 2508 which identifies the field(s) being changed, and a variable length field which includes the first-order (FO) difference of RTP field whose second-order (SO) difference is non-zero. The header format as shown in FIG. 5B is sent from the compressor 26 of source terminal 20 to the de-compressor 36 of destination terminal 30, when for example, the timestamp (T=1) has changed as shown in FIG. 4A.

Figure 5C:
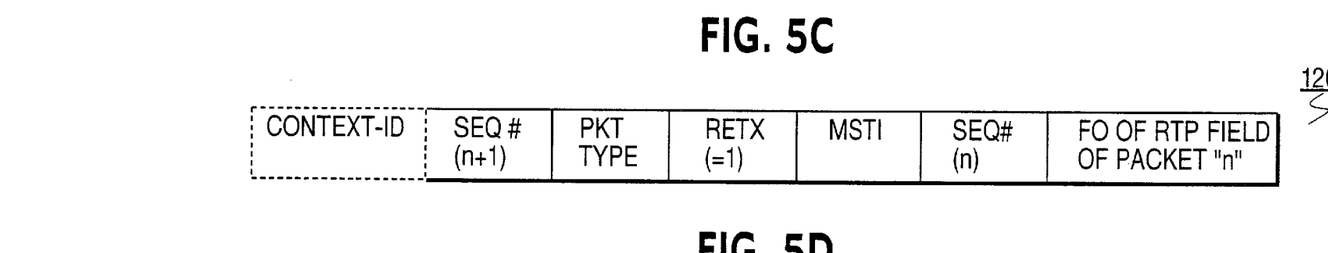

FIG. 5C illustrates a header format when repeating the first-order (FO) in packet following packet "n" shown in FIG. 5B (e.g., in packet "n+1"). As shown in FIG. 5C, the header segment 120 of a data packet 100 may include a context identifier (ID) field, a sequence number (n+1) field for packet "n+1", a packet type field which identifies the type of the packet (e.g., RTP compressed header, full header etc.), a retransmit (ReTx=1) bit which indicates if the first-order (FO) difference being sent is for the packet with non-zero second-order (SO) difference or is for packets that follow it, a MSTI field as described in RFC 2508 which identifies the field(s) being changed, a sequence number (n) field for packet "n", and a variable length field which indicates the first-order (FO) difference of RTP field of packet "n". The header format as shown in FIG. 5C is sent from the compressor 26 of source terminal 20 to the de-compressor 36 of destination terminal 30 with respect to a next packet (n+1) or (n+2), when for example, the timestamp (T=0) has not changed as shown in FIGS. 4A and 4B.

Figure 5D:
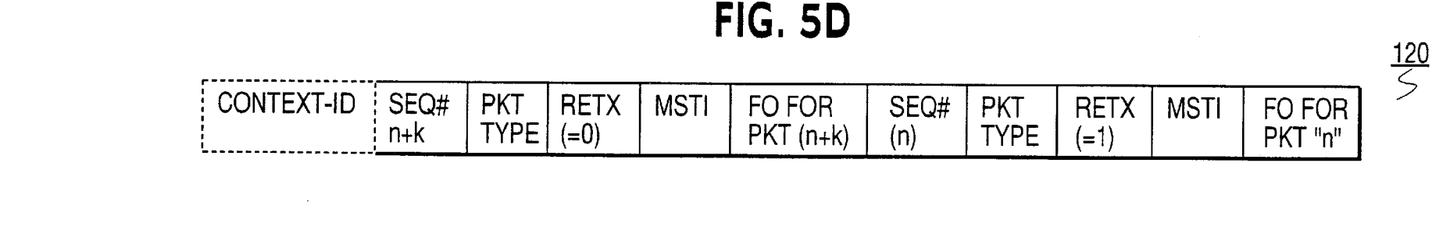

FIG. 5D illustrates a header format when a second-order (SO) difference for packet "n+k" (or "n+1" as described with reference to FIG. 4B) is non-zero while a first-order (FO) difference for packet "n" is being communicated (e.g., combination of FIGS. 5B and 5C). As shown in FIG. 5D, the header segment 120 of a data packet 100 may include a context identifier (ID) field; a sequence number (n+k) field for packet "n+k" (or "n+1" field for packet "n+1" as described with reference to FIG. 4B); a packet type field which identifies the type of the packet (e.g., RTP compressed header, full header etc.); a retransmit (ReTx=0) bit which indicates that the first-order (FO) difference being sent is for the packet "n+k" (or "n+1" as described with reference to FIG. 4B) with non-zero second-order (SO) difference or is for packets that follow it; a bit combination (MSTI) field as described in RFC 2508 which identifies the field(s) being changed; a field which indicates a first-order (FO) difference for packet (n+k) (or packet "n+1" as described with reference to FIG. 4B), a sequence number (n) field for packet "n"; another packet type field which identifies the type of the packet "n", a retransmit (ReTx=1) bit which indicates that the first-order (FO) difference being sent is for the packet "n" with non-zero second-order (SO) difference; and another bit combination (MSTI) field as described in RFC 2508 which identifies the field(s) being changed; and a field which indicates a first-order (FO) difference for packet (n). The header format as shown in FIG. 5D is sent from the compressor 26 of source terminal 20 to the de-compressor 36 of destination terminal 30 with respect to a next packet (n+1), when for example, the timestamp (T=1) has changed as shown in FIG. 4B.

Figure 6:
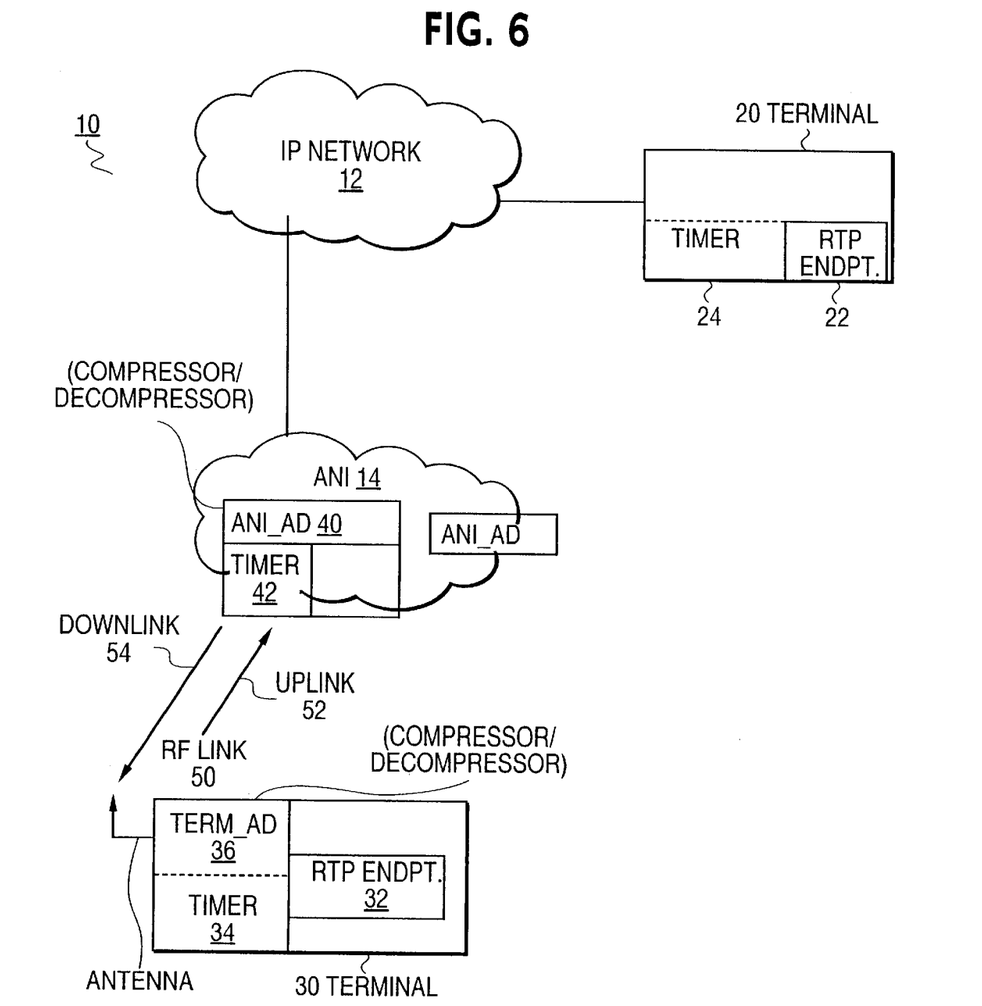
FIG. 6 illustrates one preferred usage implementation of an IP-based network of a source terminal and a destination terminal including a header compression mechanism provided for header compression and for data communications via a cellular link according to an embodiment of the present invention.

As described previously, the source terminal 20 and the destination terminal 30 shown in FIG. 1 is provided simply as an example data network. A wide variety of implementations and arrangements of any number of terminals, switches and links in all types of data networks may be possible. For example, one preferred usage implementation of such a data network of a source terminal and a destination terminal including a header compression mechanism provided for header compression may be a cellular network for real-time applications such as Voice over IP and Video conferencing as shown in FIG. 6. The bandwidth-limited link 10 may be a combination of an IP network 12 and an access network infrastructures ANI 14 and ANI 16 for providing cellular communications. The source terminal 20 may be a host PC or the like running RTP/UDP/IP, and providing packetized voice samples in RTP packets for transmission over IP network 12 and ANIs 14 and 16. The destination terminal 30 may be a mobile terminal for cellular communications with the ANI 14. Each terminal 20 and 30 may either be a source or destination terminal for RTP packets.

The terminal 20 may include a RTP endpoint 22 which identifies this terminal (e.g., including IP address, port number, etc.) as either a source or destination for RTP packets. IP network is provided as an example, however, other types of packet switched networks or the like can be used instead. Terminal 20 also includes a local timer 24 for generating a time stamp.

An access network infrastructure (ANI) 14 may be connected to IP network 12. A mobile terminal 30 may be coupled to ANI 14 via radio frequency (RF) link 50. RF link 50 includes an uplink 52 (from terminal 30 to ANI 14) and a downlink 54 (from ANI 14 to terminal 30). ANI 14 may interface one or more wireless (or radio frequency) terminals (including terminal 30) in a region to IP network 12, including converting between wireline signals (provided from IP network 12) and wireless or RF signals (provided to or from terminal 30). Thus, ANI 14 allows RTP packets received from IP network 12 to be sent over RF link 50 to the mobile terminal 30, and allows RTP packets from the mobile terminal 30 to be sent over IP network 12 to another terminal, such as terminal 20.

According to an embodiment of the present invention, ANI 14 may include one or more ANI adapters (ANI_AD) 40 each of which preferably includes a timer 42. Each ANI_AD 40 may be configured and implemented with a robust IP/UDP/RTP header compression scheme according to an embodiment of the present invention for header compression operation similarly to RFC 2508 but addressing robustness when employed in lossy and error-prone networks as described with reference to FIGS. 1–4 for correctly reconstructing headers in the presence of packet losses and errors. The ANI_AD 40 may perform header compression (prior to downlink transmission) and decompression (after uplink transmission). Headers (or one or more header fields, such as a time stamp) for RTP packets received from IP network 12 are compressed by ANI_AD 40 prior to transmission to mobile terminal 30 over downlink 54, and packet headers received from mobile terminal 30 are decompressed by ANI_AD 40 before transmission to IP network 12. Therefore, each ANI_AD 40 may be considered as a header compressor/de-compressor. Each ANI_AD 40 may also interface terminals located in a specific or different area within the region to IP network 12.

ANI_AD 40 may include a timer 42 for implementing a timer-based decompression technique. Additional ANIs may also be provided for interfacing other terminals located in additional regions to IP network 12.

Mobile terminal 30 may include an RTP endpoint 32 which is a source and/or destination (receiver) for RTP packets. Mobile terminal 30 may include a terminal adapter (term_AD) 36 which performs header compression (for packets to be transmitted uplink 52) and decompression (on packets received over downlink 54). Thus, terminal adapter (term_AD) may be considered to be a header compressor/decompressor, similar to the ANI_AD.

The terminal adapter (term_AD) 36 also includes a timer 34 for calculating an approximation (or estimate) of a RTP time stamp-of a current header. The terminal adapter (term_ AD) 36 then uses additional information in the RTP header to refine or correct the time stamp approximation. Local timer and compressed time stamp can be used to regenerate the correct time stamp for each RTP header. Other terminals may also be provided, each including its own RTP endpoint, terminal adapter and timer.

As described from the foregoing, the present invention advantageously provides a robust header compression scheme for achieving robust IP header compression in the presence of unreliable networks. The proposed scheme can also be applied flexibly based on the desired protection needed against packet losses. The protection against bit errors may be achieved by using techniques similar to that used in voice coding for example that provide uneven bit protection (but, in this case for the headers as opposed to payload).

While there have been illustrated and described what are considered to be preferred embodiments of the present invention, it will be understood by those skilled in the art that various changes and modifications may be made, and equivalents may be substituted for elements thereof without departing from the true scope of the present invention. Further, many modifications may be made to adapt a particular situation to the teachings of the present invention without departing from the central scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A data network, comprising:
    a first node comprising a header compressor/de-compressor for compressing/de-compressing headers of data packets for transmission via a bandwidth-limited link; and
    a second node comprising a header compressor/de-compressor for compressing/de-compressing headers of data packets for transmission via said bandwidth-limited link,
    wherein header compression and reconstruction are obtained by first establishing a context state for non-changing fields as well as first-order differences for changing fields between a compressor of one of said first node and said second node and a de-compressor of another one of said first node and said second node, and then when a second-order difference of any field is non-zero, sending a particular packet whose second-order difference is non-zero with a new first-order difference along with those following packets with the new first-order difference until a positive confirmation is received by the compressor that the new first-order difference has been received or until expiration of a predetermined period.

2. The data network as claimed in claim 1, wherein said predetermined period is set as a quotient of a round-trip time of a data packet and an inter-packet separation time.

3. The data network as claimed in claim 1, wherein said bandwidth-limited link provided to connect said first node to said second node corresponds to low-speed lines such as dial-up modems.

4. The data network as claimed in claim 1, wherein said bandwidth-limited link provided to connect said first node to said second node corresponds to cellular links.

5. The data network as claimed in claim 1, wherein said bandwidth-limited link provided to connect said first node to said second node corresponds to an IP-based network of an Internet Service Provider (ISP), an Internet and different source and destination networks, including, for example, a public switched telephone network (PSTN), an integrated services digital network (ISDN) and other access network infrastructures (ANI) for enabling communications between said first node and said second node.

6. The data network as claimed in claim 1, wherein the compressor combines the new first-order difference with the original first-order difference for transmission to the de-compressor, when the corresponding field changes again with non-zero second-order difference during a period of communicating the first-order difference.

7. The data network as claimed in claim 1, wherein said data packets each includes at least a header field comprising a time stamp and a packet sequence number.

8. The data network as claimed in claim 7, wherein said header compression mechanism is implemented to correctly reconstruct headers of said data packets in the presence of packet losses and errors.

9. The data network as claimed in claim 7, wherein said headers are IP/UDP/RTP headers used for real-time communications on the Internet and for applications such as Voice over IP and Video conferencing.

10. The data network as claimed in claim 8, wherein said header compression mechanism is implemented to terminate sending the first-order difference for changing fields unless the corresponding second-order difference is non-zero, after the context state has been established.

11. A packet network, comprising:
a source terminal providing a plurality of packets each packet including a header field;
a destination terminal;
a bandwidth-limited link providing connection between the source terminal and the destination terminal; and
at least one network interface controller of the source terminal or the destination terminal comprises a header compression mechanism installed therein for header compression and reconstruction, said header compression mechanism establishing a context state for non-changing fields as well as first-order differences for changing fields, and then when a second-order difference of any field is non-zero, sending a particular packet whose second-order difference is non-zero with a new first-order difference along with those following packets with the new first-order difference until a positive confirmation is received indicating that the new first-order difference has been received or until expiration of a predetermined period.

12. The packet network as claimed in claim 11, wherein said predetermined period is set as a quotient of a round-trip time of a data packet and an inter-packet separation time.

13. The packet network as claimed in claim 11, wherein said bandwidth-limited link provided to connect said first node to said second node corresponds to low-speed lines such as dial-up modems.

14. The packet network as claimed in claim 11, wherein said bandwidth-limited link provided to connect said first node to said second node corresponds to cellular links.

15. The packet network as claimed in claim 11, wherein said bandwidth-limited link provided to connect said first node to said second node corresponds to an IP-based network of an Internet Service Provider (ISP), an Internet and different source and destination networks, including, for example, a public switched telephone network (PSTN), an integrated services digital network (ISDN) and other access network infrastructures (ANI) for enabling communications between said first node and said second node.

16. The packet network as claimed in claim 11, wherein the compressor combines the new first-order difference with the original first-order difference for transmission to the de-compressor, when the corresponding field changes again with non-zero second-order difference during a period of communicating the first-order difference.

17. The packet network as claimed in claim 11, wherein said header field comprises a time stamp and a packet sequence number.

18. The packet network as claimed in claim 11, wherein said header compression mechanism is implemented to correctly reconstruct headers of said packets in the presence of packet losses and errors.

19. The packet network as claimed in claim 11, wherein said headers are IP/UDP/RTP headers used for real-time communications on the Internet and for applications such as Voice over IP and Video conferencing.

20. The packet network as claimed in claim 11, wherein said header compression mechanism is implemented to terminate sending the first-order difference for changing fields unless the corresponding second-order difference is non-zero, after the context state has been established.

21. A method for achieving robust header compression between a compressor and a de-compressor in the presence of an unreliable network, comprising:
sending headers of data packets, from said compressor to said de-compressor via a bandwidth-limited link until said de-compressor establishes a context state for non-changing fields of said data packets as well as first-order differences for changing fields;
when the context state has been established between said compressor and said de-compressor, determining whether a second-order difference of any field is non-zero; and
when the second-order difference of any field is non-zero, sending a particular packet whose second-order difference is non-zero with a new first-order difference along with those following packets with the new first-order difference until a positive confirmation is received indicating that the new first-order difference has been received or until expiration of a predetermined period.

22. The method as claimed in claim 21, wherein said predetermined period is set as a product of a round-trip time of a data packet and an inter-packet separation time.

23. The method as claimed in claim 21, wherein said bandwidth-limited link provided to connect said compressor and said de-compressor corresponds to low-speed lines such as dial-up modems.

24. The method as claimed in claim 21, wherein said bandwidth-limited link provided to connect said compressor and said de-compressor corresponds to cellular links.

25. The method as claimed in claim 21, wherein said bandwidth-limited link provided to connect said compressor and said de-compressor corresponds to an IP-based network of an Internet Service Provider (ISP), an Internet and different source and destination networks, including, for example, a public switched telephone network (PSTN), an integrated services digital network (ISDN) and other access network infrastructures (ANI) for enabling communications between said first node and said second node.

26. The method as claimed in claim 21, wherein the new first-order difference is combined with the original first-order difference for transmission to the de-compressor, when the corresponding field changes again with non-zero second-order difference during a period of communicating the first-order difference.

27. The method as claimed in claim 21, wherein said data packets each includes a header field comprising a time stamp and a packet sequence number.

28. The method as claimed in claim 21, wherein said headers are IP/UDP/RTP headers used for real-time communications on the Internet and for applications such as Voice over IP and Video conferencing.

29. A host readable medium comprising instructions that, when executed by a host system including a compressor/de-compressor, cause the host system to obtain robust header compression between a compressor and a de-compressor of a remote system by:

sending headers of data packets, from said compressor to said de-compressor via a bandwidth-limited link until said de-compressor establishes a context state for non-changing fields of said data packets as well as first-order differences for changing fields;

when the context state has been established between said compressor and said de-compressor, determining whether a second-order difference of any field is non-zero; and when the second-order difference of any field is non-zero, sending a particular packet whose second-order difference is non-zero with a new first-order difference along with those following packets with the new first-order difference until a positive confirmation is received indicating that the new first-order difference has been received or until expiration of a predetermined period.

30. The host readable medium as claimed in claim 28, wherein said predetermined period is set as a quotient of a round-trip time of a data packet and an inter-packet separation time.

31. The host readable medium as claimed in claim 28, wherein said bandwidth-limited link provided to connect said first node to said second node corresponds to either low-speed lines or cellular links.

32. The host readable medium as claimed in claim 28, wherein the compressor combines the new first-order difference with the original first-order difference for transmission to the de-compressor, when the corresponding field changes again with non-zero second-order difference during a period of communicating the first-order difference.

33. The host readable medium as claimed in claim 28, wherein said header field comprises a time stamp and a packet sequence number, and said headers are IP/UDP/RTP headers used for real-time communications on the Internet and for applications such as Voice over IP and Video conferencing.

* * * * *